United States Patent [19]

Rossberg

[11] Patent Number: 5,064,267
[45] Date of Patent: Nov. 12, 1991

[54] METHOD OF MANUFACTURING AN OPTICAL FUSED-FIBER COUPLER AND THE COUPLER MANUFACTURED THEREBY

[75] Inventor: Rolf Rossberg, Schwieberdingen, Fed. Rep. of Germany

[73] Assignee: Alcatel N.V., Amsterdam, Netherlands

[21] Appl. No.: 580,920

[22] Filed: Sep. 10, 1990

[30] Foreign Application Priority Data

Sep. 8, 1989 [DE] Fed. Rep. of Germany ....... 3930035

[51] Int. Cl.[5] ............................................... G02B 6/26
[52] U.S. Cl. ........................................ 385/50; 385/51; 385/27
[58] Field of Search ............... 350/96.15, 96.29, 96.30, 350/320

[56] References Cited

U.S. PATENT DOCUMENTS

| Re. 33,296 | 8/1990 | Stowe et al. | 350/320 |
|---|---|---|---|
| 4,737,005 | 4/1988 | Burns et al. | 350/96.15 |
| 4,743,497 | 6/1988 | Fujii et al. | 350/96.15 |
| 4,906,068 | 3/1990 | Olson et al. | 350/96.30 |
| 4,932,740 | 6/1990 | Berkey et al. | 350/96.15 |

FOREIGN PATENT DOCUMENTS 3716247 11/1988 Fed. Rep. of Germany .

OTHER PUBLICATIONS

"All–Fibre Polarising Beamsplitter," *Electronics Letters*, 14th Mar. 1985, vol. 21, No. 6, M. S. Yataki et al.
"Fibre–Optic Polarising Beam Splitter Employing Birefringent–Fibre Coupler," *Electronics Letters*, 9th May 1985, vol. 21, No. 10, I. Yokohama et al.

*Primary Examiner*—Frank Gonzalez
*Attorney, Agent, or Firm*—Christie, Parker & Hale

[57] ABSTRACT

During the process of manufacturing polarization-selective fused-fiber couplers (1) having two or more input fibers and two or more output fibers and formed in the coupling region (fused region 6) from parallel, nonbirefringent, matched-cladding single-mode fibers, prior to the fusion of the fibers, linearly polarized light with a selected wavelength is fed into one of the input fibers (2) and detected at the ends of the two output fibers (3). The fibers are thereupon fused together with the coupler (1) being drawn until the coupling between the two fibers ceases to fluctuate. The source of heat is then turned off. With the method it is possible to manufacture fused-fiber couplers (1) whose lengths are only approximately 10 mm to 15 mm.

10 Claims, 1 Drawing Sheet

METHOD OF MANUFACTURING AN OPTICAL FUSED-FIBER COUPLER AND THE COUPLER MANUFACTURED THEREBY

TECHNICAL FIELD

The invention concerns a method of manufacturing a polarization-selective fused-fiber optical coupler and a fused-fiber coupler so made. Such couplers are used in optical communications systems.

BACKGROUND ART

In the publication ELECTRONICS LETTERS of 14 March 1985, Vol. 21, No. 6, pp. 249-251, a polarization-selective fused-fiber optical coupler which was manufactured from nonbirefringent single-mode fibers with matched cladding is described by M.S. Yataki, D.N. Payne, and M.P. Varnham under the title "All-Fibre Polarising Beamsplitter." It turned out that fused-fiber couplers with such single-mode fibers had to be drawn to a very long length to obtain the polarization-selective characteristic--approximately 10 cm to 30 cm. In the process, the fibers become very thin and are therefore very sensitive and difficult to handle. Furthermore, because of the high number of couplings occurring at this length, such a fused-fiber coupler is highly wavelength-selective, making manufacture for a specific wavelength more difficult, since the laser must then be selected and perhaps even stabilized in wavelength.

From the publication ELECTRONICS LETTERS of 9 May 1985, Vol. 21, No. 10, pp. 415 and 416, the article "Fibre-Optic Polarising Beam Splitter Employing Birefringent-Fibre Coupler" by I. Yokohama, K. Okamoto, and J. Noda reveals that it is possible to manufacture polarization-selective fused-fiber couplers with significantly shorter lengths using polarization-maintaining fibers. However, for this, only special types of fibers which are not standard in the trade may be used, such as with stress-applying parts (SAP) with matching refractive indexes, but which are very difficult to obtain and are very expensive.

DISCLOSURE OF INVENTION

The object of the invention is to provide a method for manufacturing a polarization-selective fused-fiber optical coupler of a short length and to produce a fused-fiber coupler manufactured thereby which consists of nonbirefringent single-mode fibers with matched cladding and which is both simpler and more cost-effective to manufacture than the comparable known fused-fiber couplers.

To that end, during the process of manufacturing a polarization-selective fused-fiber coupler, prior to the fusion of the fibers, linearly polarized light with a selected wavelength is fed into one of the input fibers and detected at the ends of the two output fibers. The fibers are thereupon fused together with the coupler being drawn until the coupling between the two fibers ceases to fluctuate. The source of heat is then turned off. By such a method, it is possible to manufacture fused-fiber couplers whose lengths are only approx. 10 mm to 15 mm.

The solution found has, among others, the advantage that the fused region of the coupler has only a short length. Therefore, it can be handled without difficulty and is relatively insensitive to damage even before protective embedding in a housing. Furthermore, manufacture is simpler, resulting in a savings of time and expense. Additional advantages are mentioned in the description.

BRIEF DESCRIPTION OF DRAWINGS

The invention is described in detail below using an exemplary embodiment presented in the appended drawings, which show.

BEST MODE FOR PRACTICING THE INVENTION

Figure 1:
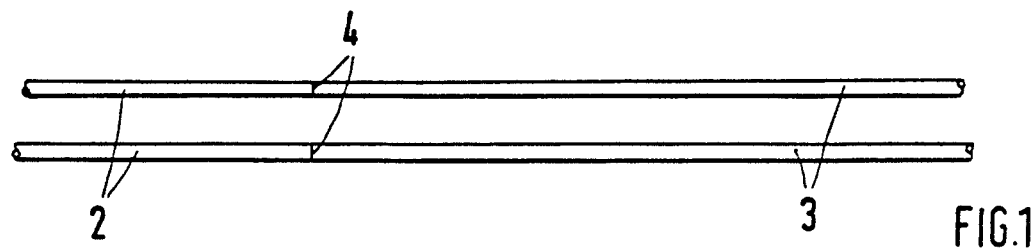
FIG. 1 —two polarization-maintaining fiber ends lying parallel next to each other, which fiber ends are each spliced to one fiber end of two nonbirefringent single-mode fibers before the manufacture of the fused-fiber coupler.
Figure 2:
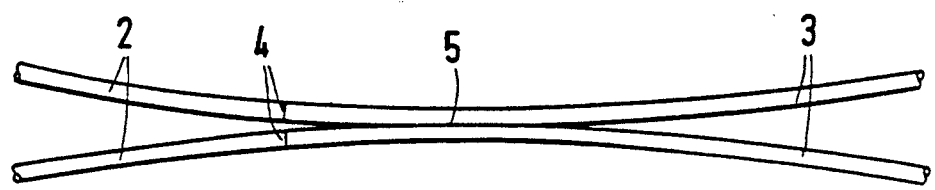
FIG. 2 —the fibers of FIG. 1, during manufacture of the fused-fiber coupler.

In FIG. 1, the input fibers of the fused-fiber coupler (1) to be manufactured, hereinafter referred to as the "coupler", are indicated with the reference number 2. They are polarization-maintaining single-mode fibers whose ends are each linked by splicing to one end of a normal, nonbirefringent single-mode fiber of the matched cladding type. Preferably the splices are connections produced in known fashion by fusion welding of the fiber ends. Following manufacture of the coupler 1, the nonbirefringent single-mode fibers form the output fibers 3, which also are the connection fibers. After the splices (4) are made, the fiber pair is fixed in a drawing (pulling) device (not shown) in such a way that the optical axes of the polarization-maintaining single-mode fibers (input fibers 2) lie parallel and perpendicular to the coupler axis and the nonbirefringent single-mode fibers (output fibers 3) lie parallel to each other in a region which is a relatively short distance from the splices (4), with the fibers unchanged in their cross-section. Next, light is fed into one of the input fibers 2 and detected at the end of both output fibers 3. Then, the nonbirefringent single-mode fibers are fused together at the contact point 5 (FIG. 2) and the coupler 1 is concurrently drawn apart in an axial direction, biconically tapering the fibers. Thus, coupling of the light occurs even with short drawing lengths. To obtain a high degree of separation of polarization directions, a length as short as 10 mm to 15 mm is adequate. Preferably, the length is approx. 11 mm to 13 mm. The length is thus advantageously only insignificantly longer than conventional wavelength-selective fused couplers.

Figure 3:
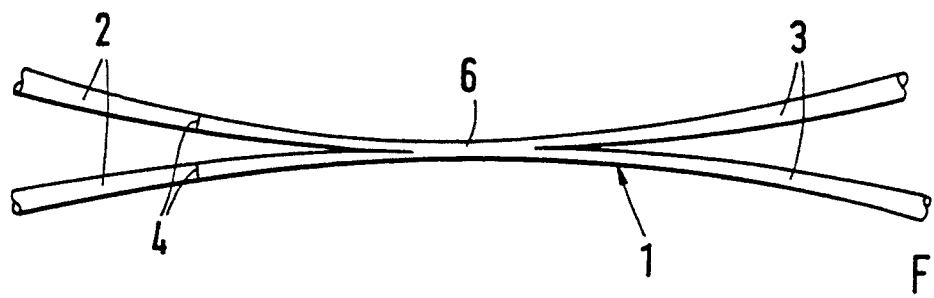
FIG. 3 —the fibers of FIG. 2, following manufacture of the fused-fiber coupler.
Figure 4:
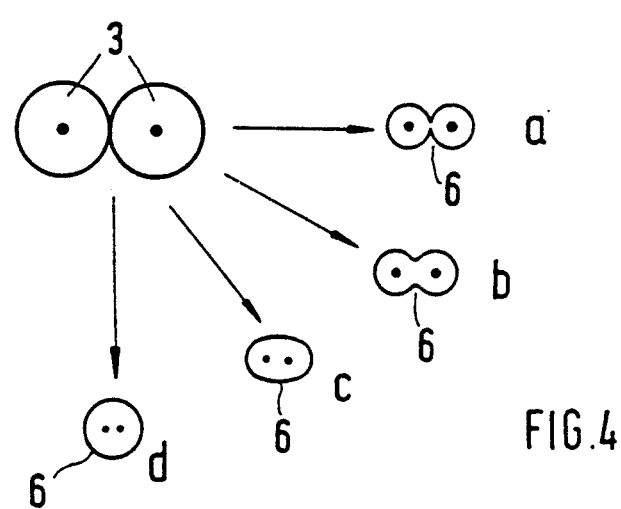
FIG. 4 —cross-sectional configurations of the fused region of various couplers.

FIG. 3 shows the finished (drawn and cooled) coupler 1, including the hardened fused region 6 which is constituted by the fused together portions of the output fibers 3 and which determines the optical characteristics of the coupler. Depending on the characteristics desired, a fused region 6 is produced with the output cross-section of the input fibers shown in FIG. 4, which according to a. has a slight degree of fusion, with the cladding areas of the nonbirefringent single-mode fiber only fused to each other linearly;

b. has a medium degree of fusion, with a slight constriction of the cladding surfaces between the nonbirefringent single-mode fibers;

c. has a high degree of fusion with an elliptical cross-section;
d. has an extremely high degree of fusion with a virtually circular cross-section.

The coupler 1 (reference b) preferably manufactured with a medium degree of fusion demonstrates for linearly polarized light (perpendicular or parallel to the coupling plane) the wavelength dependence of a wavelength-selective fused-fiber coupler. There is a phase shift of 180° in the wavelength dependence of the two polarization directions. Crosstalk attenuation between the two polarization directions (perpendicular and parallel to the coupling plane) is approx. 19 dB to 25 dB in a relatively large useful wavelength range, while the degree of polarization in the outgoing fibers (output fibers 3) is likewise very high and extinction values of approximately 25 dB to 30 dB are obtained. This coupler 1 with nonbirefrigent single-mode fibers thus combines the characteristics of two couplers, like those proposed in DE-OS 37 16 247.0 of K. Fuß ganger for a communication system with wavelength- and polarization-multiplexing.

The distance between wavelengths of adjacent channels for the coupler 1 is roughly 50 nm. At the 3-dB point, at which exactly the same amount of light is present in both channels, the coupler 1 demonstrates no polarization selectivity. 25 nm away, with longer or shorter wavelengths, maximum polarization selectivity is present. This phenomenon serves to optimize the polarization-selective coupler 1. If the coupler 1 is needed, for example, for use at a wavelength of 1530 nm, linearly polarized light of wavelength 1505 nm is fed into an input fiber 2. The fusion process is induced by the application of heat to the fusion region. During the fusion process, the input light is coupled to the other fiber during the elongation of the fusion region, then back again, etc., with the light coupled less completely as the length of the fusion region increases. The drawing process is terminated when the coupling between the two channels ceases to fluctuate, and the same amount of light is thus present in both channels. The light and heat sources are then turned off, the coupler 1 with the connecting fibers removed from the drawing device, and then mechanically mounted in a protective housing. Preferably, the fibers leading from the fused region 6 to each connecting fiber including the splices 4 are disposed bend-free inside the coupler housing where they are fixed in place. In this manner, the connecting fibers (input/output fibers 2, 3) are protected from stress.

The polarization-selective coupler 1 manufactured in this manner has very good characteristics. In addition to its relatively short length, it excels on account of its very slight insertion losses, which are less than 0.5 dB. It may be used to couple two lasers of the same wavelength to one fiber (laser redundancy, e.g., for underwater amplifiers). For this application, the polarized light of one laser is fed in parallel and the other perpendicular to the coupling plane. In this case, fan-in of the laser light into a standard single-mode fiber occurs in the coupler. To ensure that this happens, polarization-maintaining fibers (input fibers 2) are used between the laser and the coupler 1. Otherwise, fluctuations in intensity would be present which would lead to noise (polarization noise). The separation of the incoming laser light into two components perpendicular to each other permits use of the coupler for polarization-diversity reception.

At different wavelengths and different polarization, both the wavelength and the polarization are separated in the coupler 1, assuring a high degree of far-end crosstalk attenuation.

I claim:

1. Method of manufacturing a polarization-selective fused-fiber coupler having two or more input fibers and two or more output fibers connected to a coupling region formed from two parallel, nonbirefringent, matched-cladding single-mode fibers, comprising the steps:
   prior to and during the formation of the coupling region:
      feeding linearly polarized light of a selected wavelength into one of the input fibers, and detecting said light at the output ends of the fibers; and
   forming a coupling region in which the two fibers are fused together by:
      applying heat in the coupling region,
      drawing out the coupling region until the light detected at the two output ends stabilizes and an equal amount of light is detected from each output fiber, and then
      turning off the source of heat.

2. A method of manufacturing a fused-fiber coupler as claimed in claim 1, wherein prior to the fusion of the nonbirefringent single-mode fibers, a polarization-maintaining single-mode input fiber is spliced to each nonbirefringent fiber by welding.

3. Polarization-selective fused-fiber coupler manufactured by the method claimed in claim 1, which has two or more input fibers and two or more output fibers diverging from said coupling region and is formed in the coupling region from two parallel, nonbirefringent, matched-cladding single-mode fibers, wherein the length of the fused coupling region of the fused-fiber coupler is 10 mm to 15 mm.

4. A coupler as claimed in claim 3, wherein the input end of each of the single-mode fibers diverging from the fused region has a polarization-maintaining single-mode fiber spliced thereto, and that the optical axes of said polarization-maintaining single-mode fibers are parallel to each other and perpendicular to the coupling plane.

5. A Coupler as claimed in claim 3, wherein the fibers extending from the fused region to an input or output fiber are disposed bend-free in a coupler housing and are fixed in the coupler housing together with the splices.

6. A coupler as claimed in claim 3, characterized by being polarization-selective for light of predetermined ranges of wavelengths.

7. A coupler as claimed in claim 3, characterized by being wavelength-selective for light of a direction of polarization parallel or perpendicular to the coupling plane.

8. A coupler as claimed in claim 3, characterized by having nearly the same wavelength dependence for light of a direction of polarization parallel to the coupling plane and for light of a direction of polarization perpendicular to the coupling plane, with the two directions of polarization differing in phase by 180°.

9. A coupler as claimed in claim 3, characterized by being polarization- and wavelength-sensitive at two different wavelengths.

10. A coupler as claimed in claim 3, wherein in the fused region, the single-mode fibers exhibit a medium degree of fusion with cladding areas which have only a small constriction.

* * * * *